UNITED STATES PATENT OFFICE 2,651,576

CARAMEL COLOR COMPOSITIONS

Joseph B. Longenecker and James E. Cleland, Granite City, Ill., assignors to Union Starch & Refining Company, Columbus, Ind., a corporation of Indiana No Drawing. Application November 30, 1950, Serial No. 198,488

3 Claims. (Cl. 99—148)

This invention relates to a novel caramel color composition, more particularly it relates to a solid caramel color material and a liquid solution thereof.

The caramel colors of commerce are produced by well known caramelization processes in which heat is applied to concentrated sugar solutions which may contain various amounts of catalysts preferably of an alkaline nature, the most commonly used being compounds of ammonia. Caramelization or the production of coloring power cannot be carried beyond certain limits which are imposed by the instability imparted by "overburning" and attainment of excessive viscosity, humin formation, charring and other undesirable results. Consequently the commercial caramel colors ordinarily contain only about 25% of the weight of the sugar solids in the form of coloring compounds, the remainder of the solids being primarily unchanged or slightly modified sugars. The essential characteristic, therefore, that of color imparting power or as it is known in the trade, tinctorial power, has been limited in the past by the practical degree of carmelization realizable under the limitations of the processes available.

In United States application Serial No. 753,054, filed June 6, 1947, now Patent No. 2,533,221, of which this application is a continuation-in-part, and United States application Serial No. 174,786, filed July 19, 1950, there are disclosed processes for separating solid caramel coloring compounds which are substantially free from contaminating carbohydrates. These precipitated compounds are from 3-5 or more times as powerful as coloring agents than any other caramel color product manufactured on a commercial scale. They have a bland flavor and are essentially odorless. They are stable in all the tests to which caramel colors are ordinarily subjected, such as the test for stability in acidified solutions, etc. The product is considered to be a mixture of substantially pure caramelan and caramelen in accordance with current ideas of constitution.

This solid caramel color compound can be added as a dry material to liquid or solid compositions which it is desired to color but many times it is desirable to have a color that can be added in the form of a relatively concentrated solution.

An object of this invention is to provide a concentrated caramel color composition for addition to food products.

Another object of the invention is to provide a liquid caramel color solution which has a greater coloring power than liquid caramel color compositions made heretofore.

These objects and others ancillary thereto are obtained by precipitating the caramel color bodies from a caramelized carbohydrate solution, separating the precipitated color bodies, and dissolving the concentrated product mix in water, to which is added a non-toxic stabilizer such as propylene glycol.

The dimers and other polymers of propylene alcohol and the polyalkylene oxides by themselves or combined with sorbitan esters such as the sorbitan monostearate polyoxyethylene derivation in which the polyoxyethylene portion comprises a number of $(CH_2-CH_2-O-)$ units, can be added as the stabilizers. The stabilizer can be added in the proportion of 2-20% of the composition and the solid caramel color bodies can be added to produce a 30-60% solution thereof. This constitutes a considerable advantage over the ordinary caramel solution which contains about 25% of coloring compounds and which in addition contains non-coloring carbohydrate components which may be undesirable for some uses.

The separated caramel color bodies may be dried prior to dissolving or they may be added to the solvent liquid as a dispersion in the alcoholic precipitating liquid. The alcohol being diluted by the solvent does not harm the resulting solution and actually acts as a preservative reagent.

A very satisfactory way to form the solution is to heat the water and propylene glycol mixture to a temperature of not over 180° F. and add the powdered caramel color bodies in small amounts with constant stirring and thereafter cool the solution obtained.

The following example illustrates how the solid, substantially pure color bodies are obtained.

Example 1

A solution of thirty-two (32) gallons of an alcoholic mixture of 85% of total alcohols, by volume, and 15% water is prepared in which the alcohols are: 3.6 parts methanol or ethanol and 1.0 parts isopropyl. The temperature is reduced below 80° F. and preferably to about 50° F. and agitation is started by means of a mechanical stirrer. Caramel color of approximately 25 tinctorial power and 36° Bé. is added in fine streams by means of a nozzle until a total of 168 pounds has been included. Agitation is continued until complete mixture is obtained.

On allowing to stand quiescent, the mixture separates into two distinct layers, in which the line of demarcation is easily apparent. Substantially all of the coloring power of the caramel will be in the lower dark colored layer and the sugars will be dissolved in the lighter colored upper layer. These layers can be separated readily by decantation or in a suitable separator equipped with valves which enable the top layer to be run off down to the line of demarcation. Other methods of liquid-liquid extraction may be applied also.

The upper layer containing the mother liquors or sugars, is stripped of its alcohols and the latter recovered by conventional solvent recovery methods. The sugars are returned (sometimes blended with fresh sugars) to the burning process and recaramelized. The lower layer containing the coloring compounds, may be redissolved in a little water, stripped of its alcohol, redissolved again and dried by any of the conventional methods using heated rolls, spray dryers, etc. We have found spray drying to be economical and efficient and controllable to the extent of making a satisfactory dry powder of suitable particle size and solubility. The powder may, of course, be reground mechanically to any degree of fineness. When non-toxic precipitants have been employed the lower layer may be dissolved directly to form a highly concentrated aqueous solution to which propylene glycol or other non-toxic solvent or stabilizing agent may be added.

The precipitated product is believed to be a mixture of substantially pure caramelan and caramelen as noted earlier.

The tinctorial power of the product is determined according to the normal color standards of this art, for example, by matching a 0.1% solution of the unknown in a cell of 1" thickness against Lovibond (series #52) caramel color slides. The tinctorial power of the solid color bodies prepared by the above Example 1 is of such intensity that the matching solution for Lovibond 52 series comparison is of 0.025% concentration. Hence to determine the degree of "color intensification" obtained by isolating and drying the color bodies in commercial caramel color, the Lovibond 52 series readings are multiplied by a factor of 4.

For example, a commercial liquid caramel color had a tinctorial power of 22 Lovibond 52 series color units when a 0.1% solution was matched in a 1" cell against the comparators slides. The solvent isolated dried color body of the Example 1 in 0.025% solution had a tinctorial power of 24 Lovibond (52 series) color units when matched in a 1" cell. The degree of color intensification was therefore $$\frac{0.1 \times 24}{0.025 \times 22}$$

or 4.36 fold increase.

The following examples illustrate how the precipitated and dried caramel color product of Example 1 can be made into a solution according to the present invention.

Example 2

2334 grams of powder obtained from Example 1 were added in 100 grams proportions to a well stirred, 160° F. mixture of 553 grams of propylene glycol plus 2639 grams of water. The resultant mixture had a tinctorial power of 44 (0.1% solution) and a Bé. of 24.3 at 60° F. The percentage of each constituent was:

Powder _____ 42.2
Propylene glycol _____ 10.0
Water _____ 47.8

Example 3

The caramel color is precipitated from the caramel solution by a mixture of 3.6 parts of ethanol and 1 part of normal butanol. The separated liquid containing the caramel color bodies, water, ethanol and butanol is filtered and the wet powder is added directly to a 5% solution of propylene glycol in water in sufficient amount to produce a 30% solution of the caramel color bodies.

It will be readily understood that this invention provides a preserved concentrated solution of caramel color compounds which solution has very high tinctorial powers.

We claim:

1. A water solution consisting essentially of water, substantially pure caramel coloring compounds of 30 to 50 tinctorial power and a non-toxic water soluble alcoholic compound selected from the group consisting of propylene glycol, propylene and ethylene glycol polymers and fatty acid derivatives of said glycol polymers.

2. A water solution consisting essentially of water, substantially pure caramel coloring compounds of 30 to 50 tinctorial power and 2–20% of propylene glycol as a stabilizer.

3. A water solution of the pure caramel coloring compounds of 30 to 50 tinctorial power, said solution consisting essentially of water, 2 to 20% of a propylene glycol polymer and 30 to 60% of caramel color bodies.

JOSEPH B. LONGENECKER.
JAMES E. CLELAND.

References Cited in the file of this patent

UNITED STATES PATENTS

| Number | Name | Date |
|---|---|---|
| 1,678,648 | Replogle | July 31, 1928 |
| 2,524,291 | Hoffman | Oct. 3, 1950 |
| 2,533,221 | Cleland et al. | Dec. 12, 1950 |

OTHER REFERENCES

"Atlas Spans and Tweens," Atlas Powder Company, Wilmington, Delaware, Reprinted, June 1945.